(12) United States Patent
Kokotovic et al.

(10) Patent No.: US 9,273,597 B2
(45) Date of Patent: Mar. 1, 2016

(54) METHOD AND SYSTEM FOR OPERATING AN ENGINE TURBOCHARGER WASTE GATE

(71) Applicant: Ford Global Technologies, LLC, Dearborn, MI (US)

(72) Inventors: Vladimir V. Kokotovic, Bloomfield Hills, MI (US); Amey Y. Karnik, Mumbai (IN); Yan Wang, Ann Arbor, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 315 days.

(21) Appl. No.: 13/896,260

(22) Filed: May 16, 2013

(65) Prior Publication Data

US 2014/0341703 A1    Nov. 20, 2014

(51) Int. Cl.
*F02D 23/00*    (2006.01)
*F16K 31/04*    (2006.01)
*F16K 31/44*    (2006.01)
*F02B 37/18*    (2006.01)
*F02D 41/00*    (2006.01)
*F02D 41/20*    (2006.01)

(52) U.S. Cl.
CPC ............ *F02B 37/183* (2013.01); *F02B 37/186* (2013.01); *F02D 41/0007* (2013.01); *F02D 2041/2065* (2013.01); *F02D 2200/0406* (2013.01); *F02D 2250/16* (2013.01); *Y02T 10/144* (2013.01)

(58) Field of Classification Search
CPC ........ F02B 37/18; F02B 37/186; F16K 31/44; F16K 31/002; F16K 31/02; F16K 31/025; F16K 31/047; F16K 1/221; F02D 41/0007

USPC ............. 60/602; 251/68, 69, 129.04, 129.11, 251/129.12, 229, 279
See application file for complete search history.

(56) References Cited

U.S. PATENT DOCUMENTS

| | | | | |
|---|---|---|---|---|
| 4,546,426 A | * | 10/1985 | Hafner et al. | 700/33 |
| 5,950,668 A | * | 9/1999 | Baumann | 251/129.04 |
| 6,012,289 A | | 1/2000 | Deckard et al. | |
| 6,135,415 A | * | 10/2000 | Kloda et al. | 251/129.11 |
| 6,244,050 B1 | | 6/2001 | Aschner et al. | |
| 6,276,385 B1 | * | 8/2001 | Gassman | 251/129.04 |
| 6,644,332 B1 | * | 11/2003 | Winkler | 137/2 |
| 6,683,429 B2 | * | 1/2004 | Pringle et al. | 251/129.11 |

(Continued)

FOREIGN PATENT DOCUMENTS

| | | | | |
|---|---|---|---|---|
| DE | 102010064226 A1 | * | 6/2012 | F02B 37/18 |
| JP | 62175237 U | * | 11/1987 | F02B 37/12 |

(Continued)

OTHER PUBLICATIONS

Kokotovic, Vladimir V. et al, "Electric Waste Gate Control System Sensor Calibration With End-Stop Detection," U.S. Appl. No. 13/896,257, filed Feb. 11, 2013, 33 pages.

*Primary Examiner* — Thai Ba Trieu
(74) *Attorney, Agent, or Firm* — Julia Voutyras; Alleman Hall McCoy Russell & Tuttle LLP

(57) ABSTRACT

A system and method for operating an engine turbocharger is described. In one example, the turbocharger includes an electrically actuated waste gate. A controller adjusts a position of the electrically actuated waste gate.

17 Claims, 5 Drawing Sheets

(56) References Cited

U.S. PATENT DOCUMENTS

| | | | |
|---|---|---|---|
| 7,284,375 B2* | 10/2007 | Butscher et al. | 60/602 |
| 7,434,397 B2 | 10/2008 | Hasegawa | |
| 7,458,249 B2 | 12/2008 | Kassner | |
| 7,461,508 B2* | 12/2008 | Rosin et al. | 60/612 |
| 7,562,527 B2 | 7/2009 | Eiraku | |
| 8,079,216 B2* | 12/2011 | Shimura et al. | 60/602 |
| 8,109,089 B2* | 2/2012 | Gilch et al. | 60/602 |
| 8,347,625 B2* | 1/2013 | Baeuerle | 60/602 |
| 8,398,051 B2* | 3/2013 | Grimseth et al. | 251/69 |
| 8,485,498 B2* | 7/2013 | Takeda et al. | 251/129.04 |
| 8,585,012 B2* | 11/2013 | Labataille et al. | F16K 1/221 251/129.04 |
| 8,770,544 B2* | 7/2014 | Kim | 251/129.11 |
| 2010/0175375 A1* | 7/2010 | Gilch et al. | 60/602 |
| 2011/0023481 A1* | 2/2011 | Baeuerle | 60/602 |
| 2011/0068287 A1* | 3/2011 | Grimseth et al. | 251/213 |
| 2011/0225967 A1* | 9/2011 | Karnik et al. | 60/602 |
| 2011/0314807 A1* | 12/2011 | Karnik et al. | 60/602 |
| 2012/0001111 A1* | 1/2012 | Takeda et al. | 251/231 |
| 2012/0060494 A1 | 3/2012 | Sato et al. | |
| 2012/0124993 A1* | 5/2012 | Kim | 60/602 |
| 2012/0138827 A1* | 6/2012 | Kim | 251/129.11 |
| 2013/0011243 A1* | 1/2013 | Alajbegovic | 415/144 |
| 2013/0312406 A1* | 11/2013 | Landsmann | F02B 37/186 60/602 |
| 2013/0327036 A1* | 12/2013 | Bogner et al. | 60/600 |
| 2014/0174073 A1* | 6/2014 | Karnik et al. | 60/602 |
| 2014/0301831 A1* | 10/2014 | Koike et al. | F02B 37/183 416/148 |
| 2014/0325981 A1* | 11/2014 | Rabhi | 60/600 |
| 2015/0198120 A1* | 7/2015 | Ueno et al. | F02M 25/0771 123/559.1 |

FOREIGN PATENT DOCUMENTS

| | | | | |
|---|---|---|---|---|
| JP | 2013142379 A | * | 7/2013 | F02B 37/183 |
| WO | WO 2009131811 A | * | 10/2009 | F16K 1/221 |
| WO | WO 2011087939 A2 | * | 7/2011 | |

* cited by examiner

METHOD AND SYSTEM FOR OPERATING AN ENGINE TURBOCHARGER WASTE GATE

BACKGROUND/SUMMARY

A turbocharger may be coupled to an engine to increase engine performance. A turbine within the turbocharger converts exhaust energy into rotational energy, and the rotational energy is transferred to a compressor which may increase air flow into the engine. At higher engine speeds and loads, the amount of engine exhaust gas energy output may reach a level that provides more air flow from the turbocharger compressor into the engine than is desired. One way to limit air flow (e.g. boost) into the engine is to bypass a portion of exhaust gas around the turbine so that less exhaust energy is available to rotate the turbine and compressor. The amount of exhaust gas passing through the bypass may be controlled via a waste gate. One type of waste gate may be vacuum actuated. However, vacuum actuation may be an issue when the engine's intake manifold is frequently filled with a positive pressure. For example, small displacement engines may operate with positive intake manifold pressures to meet driver demand torque. Since a positive pressure is greater than atmospheric pressure, vacuum is not produced in the engine's intake manifold and sufficient vacuum for controlling the waste gate may not be provided. Consequently, the waste gate may stay in its normally closed position where boost may not be adjusted.

A waste gate may also be operated via an electric actuator. The electric actuator may be adjusted whether or not there is intake manifold pressure. Thus, boost may be regulated independent of whether or not vacuum is available or being produced. However, operation and control of electrically actuated waste gates may be influenced by other factors such as temperature and noise factors including but not limited to supply voltage variation, manufacturing variation, and engine output variation. Further, it may be challenging to provide precise waste gate position control in conjunction with providing a desired level of response.

The inventors herein have recognized the above-mentioned limitations and have developed a waste gate operating method, comprising: controlling an electronically actuated waste gate including adjusting waste gate actuation responsive to turbocharger thermal expansion and contraction.

By adjusting parameters of an electric waste gate controller for thermal conditions, it may be possible to improve waste gate position control. Further, by considering temperatures around and at the waste gate, it may be possible to operate the waste gate such that the possibility of waste gate actuator degradation is reduced.

The present description may provide several advantages. In particular, the approach may improve boost control by arriving at a desired boost pressure in a more responsive manner. Further, the approach may improve boost pressure control accuracy and repeatability. Additionally, the approach may reduce the possibility of waste gate actuator degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
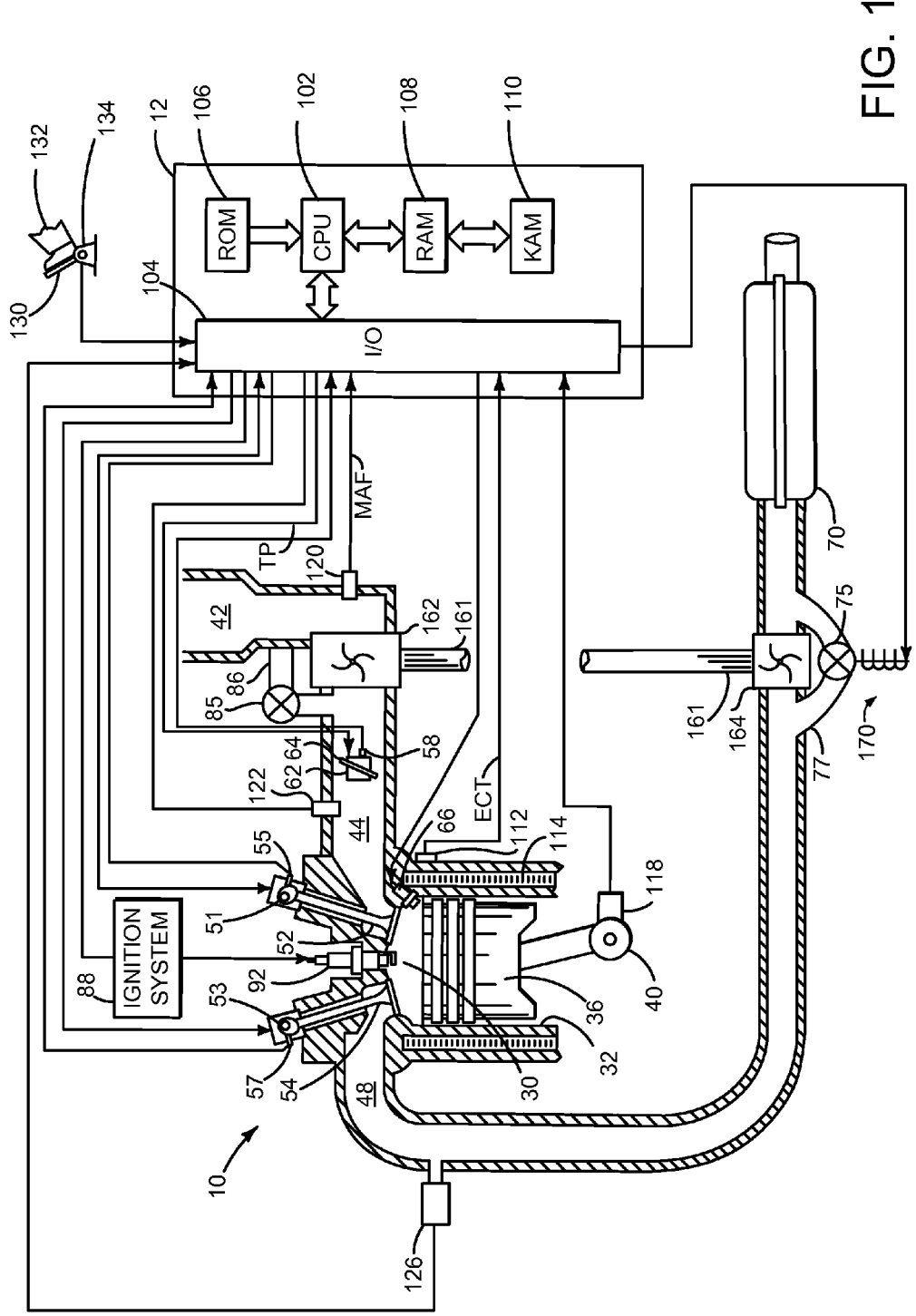
FIG. 1 shows a schematic depiction of an engine.
Figure 2:
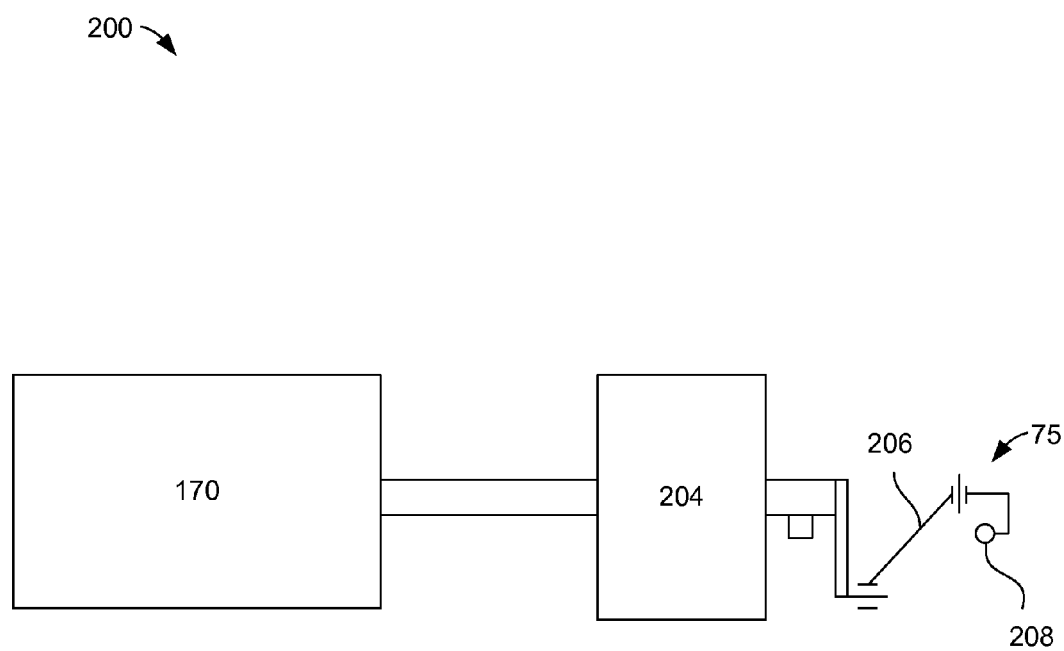
FIG. 2 shows a schematic depiction of a waste gate actuator system.

The present description is related to operating a turbocharger. In one example, a waste gate controller includes a thermal model for improving operation of an electrically controlled waste gate. The approach may improve waste gate position control as well as reduce the possibility of waste gate actuator degradation. One example system is shown in FIG. 1. The system may include a waste gate arrangement as shown in FIG. 2, and the waste gate may be operated according to the high level waste gate position control system shown in FIG. 4. FIG. 5 shows an example method for operating the turbocharger waste gate via an electric actuator.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage 77 is included so that exhaust gases may bypass turbine 164 during selected operating conditions. Flow through bypass passage 77 is regulated via waste gate 75. Waste gate 75 may be opened and closed via instructions in controller 12 that control electrical current to electric motor 170.

Compressor bypass passage 86 may be provided in some examples to limit pressure provided by compressor 162. Flow though bypass passage 86 is regulated via valve 85. Thus, air flow into manifold 44 may be adjusted via waste gate 75 and/or compressor bypass 86. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 for igniting an air-fuel mixture via spark plug 92 in response to controller 12. In other examples, the engine may be a compression ignition engine without an ignition system, such as a diesel engine. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a schematic depiction of a waste gate actuator system is shown. The waste gate actuator system shown in FIG. 2 may be applied to the engine shown in FIG. 1 and it may be operated according to the method of FIG. 4.

Waste gate system 200 includes waste gate 75 which includes waste gate plate 208. Electric motor 170 rotates gears in gearbox 204 to adjust the position of waste gate plate via four-bar link 206. In particular, rotational motion of electric motor 170 is translated into linear motion to adjust the position of waste gate plate 208 which may be in a closed position when seated in bypass passage 77 shown in FIG. 1. Waste gate plate 208, four-bar link 206, gear set 204, and electric motor 170 may be exposed to temperatures greater than ambient temperature. For example, waste gate plate 208 may be directly exposed to exhaust gas temperatures. Electric motor 170, gearbox 204, and four-bar link may be exposed to radiant exhaust heat, engine heat, and heat produced by passing current through electric motor 170. In some examples, waste gate system 200 may be located in an engine bay between an engine block and a passenger compartment bulkhead where only a limited amount of ambient air flow may be provided. Consequently, the materials in waste gate system 200 may expand and contract depending on the temperatures that the individual components reach during vehicle operation. The material expansion and contraction may affect the position of waste gate plate 208 relative to its valve seat within bypass passage 77. Additionally, the position of waste gate plate 208 relative to its valve seat may affect exhaust flow through bypass passage 77 and the amount of exhaust energy that is transferred to compressor 162 shown in FIG. 1. Therefore, it may be desirable to compensate for the temperatures of materials in the components of waste gate system 200.

The waste gate position control may also be challenging because a position of a gear box output shaft is measured while the goal is to control waste gate plate 208 relative to valve seat. In particular, the gear box output shaft is three degrees of freedom away from waste gate plate 208. Consequently, when the gear box output shaft is at a single fixed position, the position of waste gate plate 208 may vary. As such, elongation of the four-bar link or any other types of linkage system along with valve set temperature related drift may not be captured by a position sensor at the gear box output. If the waste gate position control strategy does not provide compensation seating of the valve plate on the valve seat may not be desirable. Consequently, waste gate system 200 may be exposed to undesirable stress and noise vibration and harshness (NVH) resulting in degradation.

Figure 3:
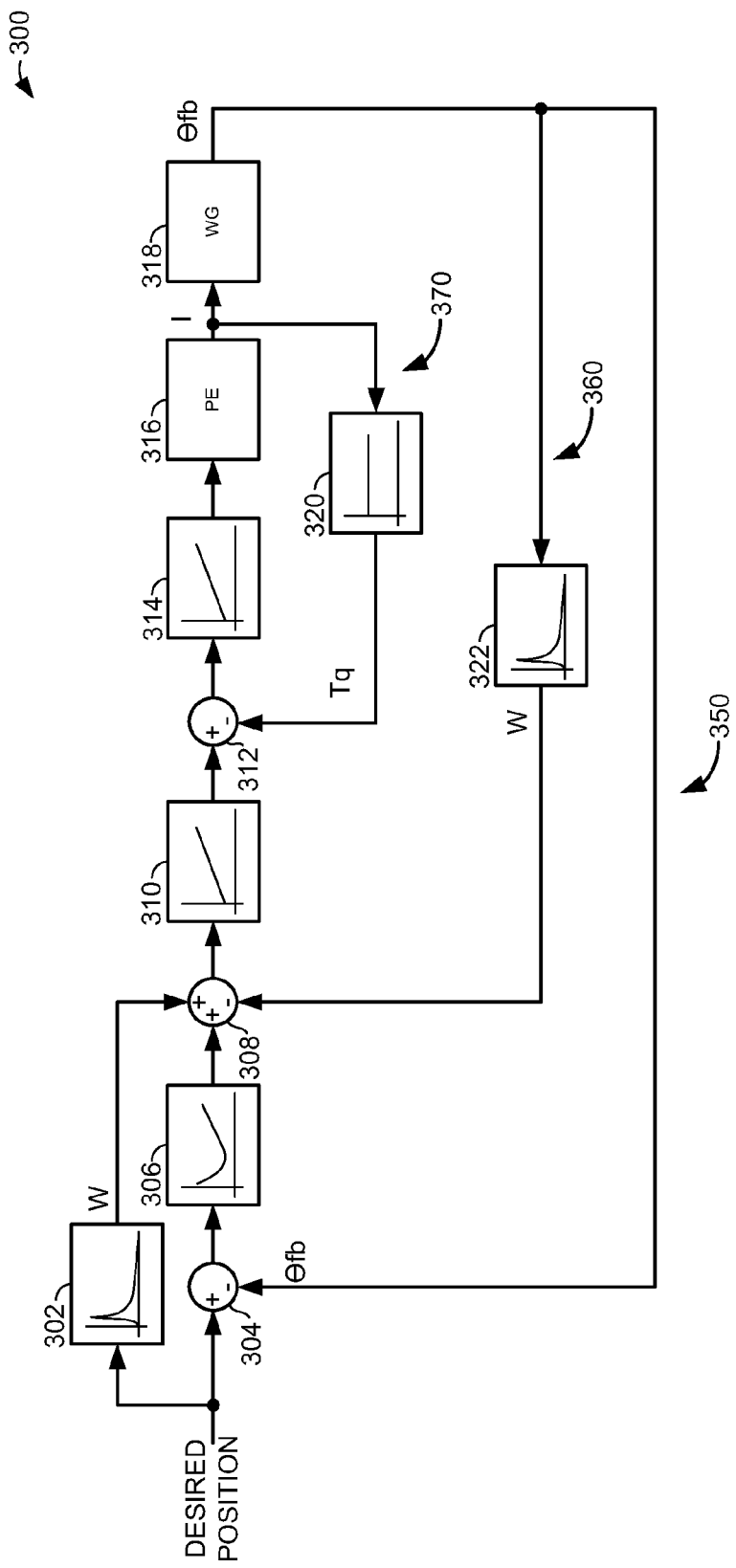
FIG. 3 shows a high level block diagram of a waste gate position control system.

Referring now to FIG. 3, a high level control block diagram for controlling an electrically actuated waste gate is shown. The control system shown in FIG. 3 may be applied in a system as shown in FIGS. 1 and 2. Additionally, the control system shown in FIG. 3 may include instructions for the method described in FIG. 4.

Figure 4:
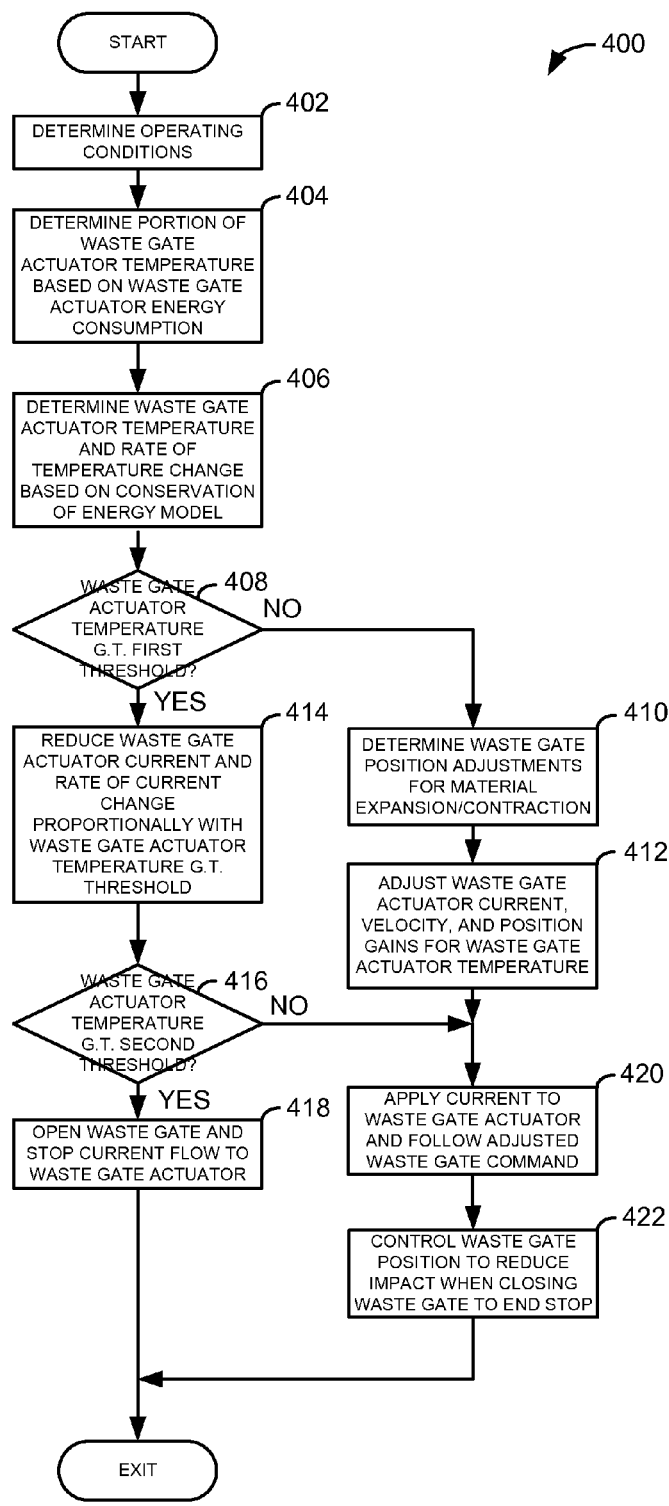
FIG. 4 shows an example method for operating an electrically actuated turbocharger waste gate.
Figure 5:
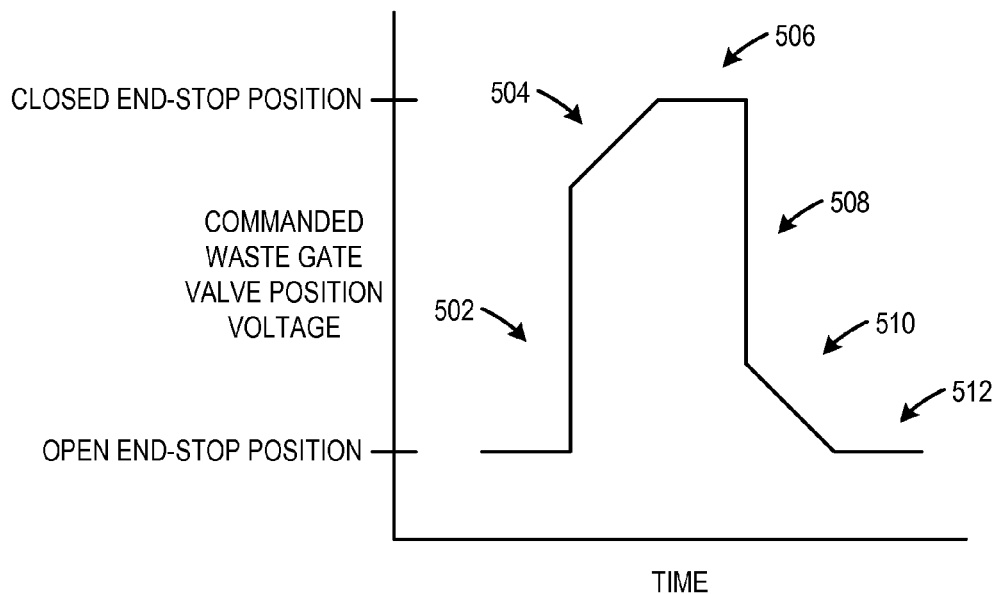
FIG. 5 shows an example of waste gate valve control strategy with end-stop detection.

The controller shown in FIG. 4 is part of a larger turbocharger boost control system. The controller shown in FIG. 4 is a closed loop controller that makes adjustments (e.g., an amount of current supplied to the electric motor) to an electric motor based on sensor feedback. The sensor feedback may include but is not limited to current flow into the motor, motor or gear box position, waste gate temperature, and engine temperature.

Controller 300 is a cascaded controller that includes three feedback loops 350, 360, and 370. In some examples, one or more of the feedback loops 350, 360, and 370 may be omitted to simplify the controller, if desired. Controller 300 has a proportional derivative (PD), proportional integral derivative (PID), form as its outer position feedback loop 350. Controller 300 also includes a proportional (P), proportional integral (PI), velocity control loop 360 as its first inner feedback loop. Finally, controller 300 includes a current control loop 370 as its second inner feedback loop.

In on example, the velocity control loop 360 may be omitted via software switches. Thus, a modified version of controller 300 may be provided with only current and position control feedback loops as described below in more detail. In another example, control loops 360 and 370 may be switched off via software so that controller 300 includes only position control feedback loop 350 as described below in more detail.

Controller 300 receives a desired waste gate position from the waste gate pressure control system as shown at the left hand side of FIG. 3. The desired waste gate position may be characterized as a waste gate angle. The desired waste gate position is directed to block 302 and summing junction 304. At block 302, the derivative of desired waste gate position is determined and output to summing junction 308. Thus, the derivative of desired waste gate position is fed forward into controller 300 as a desired waste gate angular velocity. At summing junction 304, actual waste gate position (e.g., an angle) is subtracted from the desired waste gate position to form a waste gate position error. The waste gate position error is input to PID block 306 which outputs a motor position correction to summing junction 308.

At summing junction 308, the desired waste gate angular velocity from block 302 is added to the motor position correction from block 306. Further, actual waste gate angular velocity as determined by taking a derivative of actual waste gate position at block 322 is subtracted from the sum of desired waste gate angular velocity and the motor position correction to form a motor velocity error. The output of summing junction 308 is input to block 310 were proportional and integral control actions are performed. The output of block 310 is input to summing junction 312.

At summing junction 312, motor output torque as determined via applying proportional gain at block 320 to current flowing to the motor is subtracted from the output of block 310 to provide a motor torque error. In one example, the motor current may be determined via a current sensor or it may be estimated based on a table that outputs motor current based on motor temperature and motor input voltage. The output from summing junction 312 is input to block 314 where proportional and integral actions are performed. The output of block 314 is output to power electronics (PE) 316 that drive the waste gate actuator at 318 in the form of a current. Waste gate position is determined via a sensor mechanically coupled to the waste gate actuator at a location anywhere from the electric motor, to the gearbox output, to the four-bar linkage.

In the examples previously described, the waste gate velocity feedback path 360 may be omitted via eliminating 302, 308, and 310. The output of block 306 is then input to summing junction 312 where actuator motor torque is subtracted. Additionally, 320, 314, and 312 may be omitted along with 302, 308, and 310 to provide a simplified waste gate position controller. In this example, the output of block 306 is input directly into block 316.

Referring now to FIG. 4, a method for operating an electrically actuated turbocharger waste gate is shown. The method of FIG. 4 may be stored as executable instructions in non-transitory memory of a controller as shown in FIG. 1. Further, the method of FIG. 4 may be incorporated into a system as described in FIGS. 1-3.

At 402, method 400 determines operating conditions. Operating conditions may include but are not limited to engine temperature, vehicle speed, engine speed, engine load, engine valve timings, ambient temperature, current supplied to a waste gate actuator, and voltage supplied to the waste gate actuator. Method 400 proceeds to 404 after operating conditions are determined.

At 404, method 400 determines a portion of a waste gate motor actuator temperature that is based on waste gate actuator energy consumption. In one example, waste gate motor actuator heat based on waste gate motor energy consumption is modeled in a table that outputs empirically determined waste gate motor heat generated via flowing electrical current through the waste gate actuator motor. The table is indexed with waste gate actuator motor current, ambient temperature, and engine temperature. In this way, the waste gate actuator motor temperature estimate accounts for dissipation of electrical energy by the waste gate actuator motor in the determination of waste gate actuator motor temperature. Method 400 proceeds to 406 after the portion of waste gate actuator motor temperature that is based on waste gate actuator energy consumption is determined.

As an alternative, a discrete model of the waste gate actuator motor may be stored in memory. The model may be supplied parameters and data that are equivalent to conditions applied to the waste gate actuator motor. For example, the model may be provided with a voltage applied to the actuator motor and actuator temperature estimates. The model outputs an amount of current supplied to operate the waste gate actuator motor.

At 406, method 400 determines waste gate actuator motor temperature and rate of motor temperature change based on a conservation of energy model. In particular, the change in energy in the waste gate actuator motor is determined via the following equation:

$$\Delta E = W + Q$$

Where $\Delta E$ is the change in waste gate actuator motor energy, W is work put into the waste gate actuator motor, and Q is heat put into the waste gate actuator motor. In one example, Q is estimated based on the output from 404 along with heat added to the turbocharger waste gate actuator motor from exhaust gas, heat added to the turbocharger waste gate actuator motor from the engine, heat removed from the turbocharger waste gate actuator motor from ambient cooling, and heat added or removed from the waste gate actuator motor via other sources. The energy added to the waste gate actuator motor or removed from the waste gate actuator motor is converted to heat and added to or subtracted from waste gate actuator motor temperature as determined or inferred at engine starting time. In one example, the waste gate actuator motor temperature at engine starting may be based on or correlated to a temperature of the engine at engine starting time. Additionally, temperatures of other waste gate actuator components including the gearbox, four-bar link, and waste gate plate may be determined similarly via conservation of energy. Optionally, temperatures of these components may be inferred from the waste gate motor temperature. Method 400 proceeds to 408 after waste gate actuator motor temperature is estimated.

At 408, method 400 judges whether or not the waste gate actuator motor temperature is greater than a first threshold temperature. If so, the answer is yes and method 400 proceeds to 414. Otherwise, the answer is no and method 400 proceeds to 410.

At 410, method 400 determines waste gate actuator motor position adjustments to compensate for waste gate actuator motor and waste gate actuator component temperatures. Since waste gate actuator component temperature affect waste gate component elongation, waste gate position adjustments based on actuator component temperature are provided. In one example, waste gate actuator motor position adjustments are empirically determined and stored in one or more tables or functions. Output from the tables or functions are added to the desired waste gate actuator position (e.g., motor, gearbox, or four-bar linkage position depending on location of the waste gate actuator position sensor) to provide a revised waste gate position that accounts for temperatures of waste gate actuator components including the motor, four-bar link, and gearbox. In this way, the position of waste gate plate 208 may be repeatedly controlled to a desired position even though waste gate actuator temperature affects material elongation. Method 400 proceeds to 412 after waste gate actuator position adjustments are made.

At 412, method 400 adjusts control parameters in response to temperatures of waste gate actuator components. In one example, waste gate actuator motor temperature is used to index tables or functions storing empirically determined adjustments for controller gains. The tables and/or functions may be indexed based on waste gate actuator temperature. For example, adjustments to proportional, integral, and/or derivative gains for the controller shown in FIG. 3 may be adjusted in response to waste gate actuator motor temperature. By adjusting controller gains, it may be possible to improver waste gate actuator response even in the presence of higher waste gate actuator temperatures. Further, control parameters and gains may be adjusted in response to thermal elongation of waste gate actuator components by indexing tables similar to the tables for adjusting controller gain based on waste gate actuator motor temperature. Method 400 proceeds to 420 after waste gate controller gains are adjusted.

At 414, method 400 reduces the amount of available waste gate actuator motor current. Further, the rate of change in waste gate actuator motor current may also be adjusted. In one example, the waste gate actuator motor current and rate of change in waste gate actuator motor current may be adjusted proportionately with waste gate actuator motor temperature. For example, if waste gate actuator motor temperature is greater than a threshold temperature by 20° C., the waste gate actuator motor current may be reduced by 2 amps or 10% of the temperature difference. In another example, the waste gate actuator motor current may be reduced to a predetermined current that may be known or believed to reduce waste gate actuator motor temperature. Likewise, a rate of change in waste gate actuator motor current may be reduced to a predetermined current that may be known or believed to reduce waste gate actuator motor temperature. Additionally, a duty cycle of voltage applied to the waste gate actuator motor may be adjusted to reduce waste gate actuator motor temperature. In some examples, the waste gate actuator current may be reduced in response to a rate of change in waste gate actuator temperature. For example, current supplied to a waste gate actuator motor may be reduced as a function of a rate of change in waste gate actuator motor temperature. If waste gate actuator motor temperature increases at a higher rate, waste gate actuator motor current may be reduced at a higher rate. Method 400 proceeds to 416 after waste gate actuator motor current is reduced.

At 416, method 400 judges whether or not the waste gate actuator motor temperature is greater than a second threshold temperature. If so, the answer is yes and method 400 proceeds to 418. Otherwise, the answer is no and method 400 proceeds to 420.

At 418, method 400 commands the waste gate to a fully open position so that boost pressure supplied to the engine is reduced. After the waste gate actuator reaches a full open position, current supplied to the waste gate actuator motor stops flowing and the waste gate actuator is deactivated until waste gate actuator temperature is less than a threshold temperature. Additionally, an indication if waste gate actuator degradation may be supplied to the driver. Method 400 proceeds to exit after the waste gate actuator is temporarily deactivated.

At 420, method 400 applies current to the waste gate actuator motor and adjusts the waste gate actuator position so that waste gate plate 208 is in the desired position. Proportional, integral, and derivative adjustments may be performed by the waste gate controller so that the waste gate plate 208 converges to the desired waste gate position at a desired response rate. Method 420 proceeds to 422.

Figure 6:
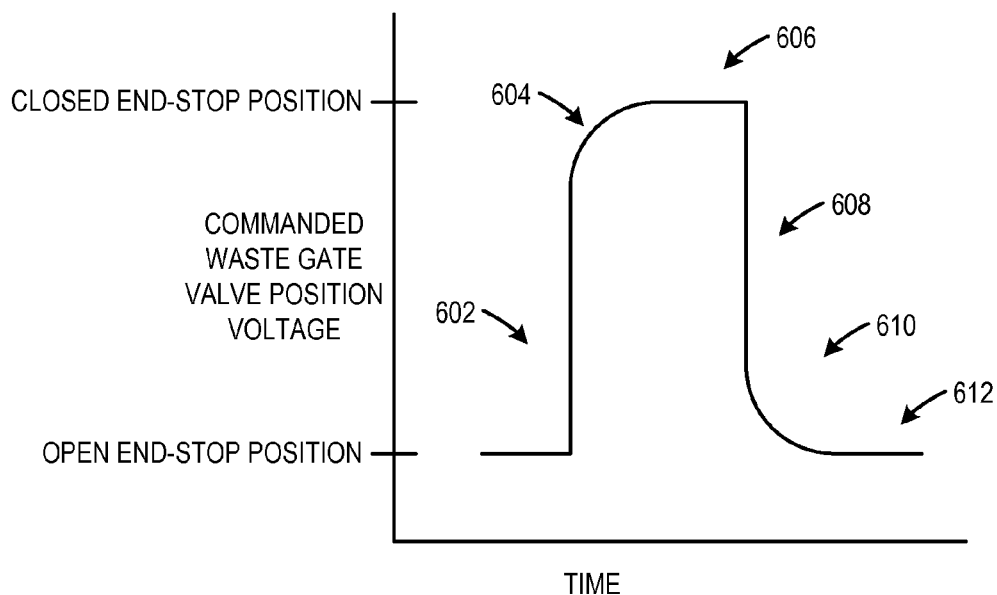
FIG. 6 shows another example of waste gate valve control strategy with end-stop detection.

At 422, method 400 adjusts the waste gate actuator position as described in FIG. 5 or 6 when the waste gate is commanded to the end stop position. The end stop position may vary during different engine operating conditions in response to temperature and other conditions. Method 400 proceeds to exit after waste gate position is adjusted as shown in FIG. 5 or 6 when the waste gate is commanded to the end stop position. If the waste gate is not commanded to the end stop, method 400 exits.

Thus, the method of FIG. 4 provides for a waste gate operating method, comprising: controlling an electronically actuated waste gate including adjusting waste gate actuation responsive to turbocharger thermal elongation. The method includes where adjusting waste gate actuation includes adjusting a position command of the electronically actuated waste gate. The method includes where adjusting waste gate actuation includes adjusting a controller gain of a waste gate controller. In some examples, the method further comprises reducing waste gate actuator motor current in response to waste gate actuator motor temperature being greater than a first threshold temperature.

In some examples, the method further comprises opening the electronically actuated waste gate and stopping current flow to the electronically actuated waste gate in response to waste gate actuator motor temperature being greater than a second threshold temperature. The method further comprises supplying current to the electronically actuated waste gate in response to waste gate actuator motor temperature being less than the first threshold temperature after stopping current flow to the electronically actuated waste gate. The method also includes where controlling the electronically actuated waste gate includes providing proportional and integral corrections.

The method of FIG. 4 also includes a waste gate operating method, comprising: controlling an electronically actuated waste gate including adjusting waste gate actuation responsive to a rate of change of waste gate actuator temperature. The method includes where controlling adjusting waste gate actuation includes adjusting an amount of current supplied to the electronically actuated waste gate. The method also includes where controlling adjusting waste gate actuation includes adjusting a rate of current supplied to the electronically actuated waste gate.

In some examples, the method includes where the electronically actuated waste gate is actuated via an electric motor. The method also includes where the electronically actuated waste gate is controlled responsive to a rate of change of waste gate actuator temperature when waste gate actuator temperature exceeds a threshold temperature. The method further includes where the electronically actuated waste gate is controlled via a controller including a plurality of cascaded feedback paths. The method also includes where one of the plurality of cascaded feedback paths is a waste gate velocity feedback path.

The method of FIG. 4 also includes controlling an electronically actuated waste gate in the presence of thermal loads, the method comprising: adjusting an electronically actuated waste gate command in response to an actuator current, an actuator velocity, and an actuator position; and deactivating the electronically actuated waste gate in an open position in response to a temperature of the electronically actuated waste gate exceeding a threshold temperature. The method also includes where the actuator velocity is based on a derivative of waste gate position.

In one example, the method further comprises adjusting the electronically actuated waste gate command in response to a feed forward adjustment of a desired waste gate position. The method also further comprises adjusting the electronically actuated waste gate command in response to an estimated waste gate temperature estimate. The method also includes where the estimated waste gate temperature estimate is at least partially based on waste gate energy consumption. The method also includes where the estimated waste gate temperature estimate is at least partially based on energy consumed by the electronically actuated waste gate.

End-stop detection may be utilized in a waste gate valve control strategy. For example, a detected end-stop position of the waste gate valve may be considered when adjusting the waste gate valve in order to provide a "soft landing" at the end-stop position. In one example, a waste gate valve control voltage may be gradually increased to a voltage corresponding to the end-stop position or a rate of change of the waste gate valve may be reduced as the waste gate valve approaches the end-stop position. In this way, noise, vibration, harshness (NVH) conditions and valve seat wear may be reduced.

FIG. 5 shows an example waste gate valve control strategy that considers end-stop positions in accordance with an example of the present disclosure. This waste gate valve control strategy adjusts a voltage corresponding to the waste gate valve position according to a linear ramp as the waste gate valve approaches each end-stop position in order for the waste gate valve to have a soft landing on the valve seat. In particular, at 502, the waste gate valve is commanded from a fully open end-stop position to a partially closed position. At 504, the waste gate valve is adjusted according to a gradual voltage increase in the form of a linear ramp to a fully closed position. In other words, the rate of change of the waste gate valve position may be reduced as the waste gate valve approaches the end-stop position. The ramp adjustment may provide a relatively gradual adjustment that may reduce the possibility of the waste gate valve impacting the valve seat at a velocity that is greater than may be desired. At 506, the waste gate valve voltage is adjusted to a voltage level corresponding to the fully closed end-stop position. In some examples, the voltage level of the fully closed end-stop position may be adjusted based on operating conditions, such as a turbocharger pressure level. Correspondingly, at 508, the waste gate valve is commanded from the fully closed end-stop position to a partially closed position. At 510, the waste gate valve is adjusted according to a gradual voltage decrease in the form of a linear ramp to a fully open position. At 512, the waste gate valve voltage is adjusted to a voltage level corresponding to the fully open end-stop position. In some examples, the voltage level of the fully open end-stop position may be adjusted based on operating conditions, such as turbocharger pressure level. In some examples, the voltage ramp at 512 may be omitted in favor of decreasing the voltage all the way to the fully open end-stop position.

FIG. 6 shows an example waste gate valve control strategy that considers end-stop positions in accordance with another example of the present disclosure. This waste gate valve control strategy adjusts a voltage corresponding to the waste gate valve position according to an exponential curve as the waste gate valve approaches each end-stop position in order for the waste gate valve to have a soft landing on the valve seat. In particular, at 602, the waste gate valve is commanded from a fully open end-stop position to a partially closed position. At 604, the waste gate valve is adjusted according to a gradual voltage increase in the form of an exponential curve to a fully closed position. In other words, the rate of change of the waste gate valve position may be reduced as the waste gate valve approaches the end-stop position. The curve adjustment may provide a relatively gradual adjustment that may prevent the waste gate valve from crashing into the valve seat. At 606, the waste gate valve voltage is adjusted to a voltage level corresponding to the fully closed end-stop position. In some examples, the voltage level of the fully closed end-stop position may be adjusted based on operating conditions, such as a turbocharger pressure level. Correspondingly, at 608, the waste gate valve is commanded from the fully closed end-stop position to a partially closed position. At 610, the waste gate valve is adjusted according to a gradual voltage increase in the form of an exponential curve to a fully open position. At 612, the waste gate valve voltage is adjusted to a voltage level corresponding to the fully open end-stop position. In some examples, the voltage level of the fully open end-stop position may be adjusted based on operating conditions, such as a turbocharger pressure level. In some examples, the voltage curve at 512 may be omitted in favor of decreasing the voltage all the way to the fully open end-stop position.

In some examples, a minimum current signal level at which the waste gate is completely closed may be appropriately adjusted as operating conditions vary. In particular, the current signal is directly related to torque applied by the waste gate valve to compress the valve seat in order to completely close the waste gate. The minimum torque to close the waste gate may vary according to turbocharger pressure level. For example, at higher turbocharger pressure levels additional torque may be required to compress the waste gate valve against the valve seat to close the waste gate. On the other hand, at lower turbocharger pressure levels less torque may be required to compress the waste gate valve against the valve seat to close the waste gate. Accordingly, the controller may be configured to adjust the current level used to determine an end-stop position based on the turbocharger pressure level. In other words, the end-stop position voltage may vary based on turbocharger pressure.

Thus, as shown in FIGS. 5 and 6, a turbocharged engine system comprising: a waste gate valve actuated by an electric actuator; a position sensor providing feedback indicative of a waste gate valve position; and a controller including a processor and electronic storage medium holding instructions that when executed by the processor: control the electric actuator to adjust a waste gate valve position based on feedback from the position sensor relative to an end-stop position. The turbocharged engine system includes where the electronic storage medium further holds instructions that when executed by the processor: control the electric actuator based on the end-stop position, the end-stop position based on is identified by monitoring a change of feedback position relative to a change in actuator command, and control the electric actuator to reduce a rate of change of the waste gate valve position as the waste gate valve approaches the end-stop position. The turbocharged engine system includes wherein the end-stop position is a position at which the waste gate valve aligns with a valve seat to substantially stop a flow of exhaust gas (e.g., less than 5% of full scale exhaust flow through the waste gate).

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. A turbocharger waste gate control system, comprising a controller including executable instructions stored in non-transitory memory to:
determine a first threshold temperature and a second threshold temperature of a turbocharger waste gate;
control an electronically actuated turbocharger waste including adjusting turbocharger waste gate actuation responsive to turbocharger waste gate actuator thermal elongation based on a waste gate actuator temperature, and
reduce turbocharger waste gate actuator motor current in response to turbocharger waste gate actuator motor temperature being greater than the first threshold temperature of the turbocharger waste gate.

2. The system of claim 1, where adjusting turbocharger waste gate actuation includes adjusting a position command of the electronically actuated turbocharger waste gate.

3. The system of claim 1, further comprising additional instructions to open the electronically actuated turbocharger waste gate and stopping current flow to the electronically actuated turbocharger waste gate in response to turbocharger waste gate actuator motor temperature being greater than the second threshold temperature of the turbocharger waste gate.

4. The system of claim 3, further comprising additional instructions to supply current to the electronically actuated turbocharger waste gate in response to the turbocharger waste gate actuator motor temperature being less than the first threshold temperature after stopping current flow to the electronically actuated turbocharger waste gate.

5. The system of claim 1, where controlling the electronically actuated turbocharger waste gate includes providing proportional and integral corrections.

6. A turbocharger waste gate system for an engine, comprising a controller including executable instructions stored in non-transitory memory to:
determine a threshold temperature of a turbocharger waste gate actuator;
control an electronically actuated turbocharger waste including adjusting turbocharger waste gate actuation responsive to a rate of change of turbocharger waste gate actuator temperature, and
adjust the electronically actuated turbocharger waste gate responsive to the rate of change of the turbocharger waste gate actuator temperature when the turbocharger waste gate actuator temperature exceeds the threshold temperature of the turbocharger waste gate actuator.

7. The system of claim 6, where adjusting turbocharger waste gate actuation includes adjusting an amount of current supplied to the electronically actuated turbocharger waste gate.

8. The system of claim 6, where adjusting turbocharger waste gate actuation includes adjusting a rate of current supplied to the electronically actuated turbocharger waste gate.

9. The system of claim 6, where the electronically actuated turbocharger waste gate is actuated via an electric motor.

10. The system of claim 6, where the electronically actuated turbocharger waste gate is controlled via a plurality of cascaded feedback paths.

11. The system of claim 10, where one of the plurality of cascaded feedback paths is a waste gate velocity feedback path.

12. A turbocharger waste gate system for an engine comprising a controller including executable instructions stored in non-transitory memory to:
determine a threshold temperature of a turbocharger waste gate;
adjust an electronically actuated turbocharger waste gate command in response to an actuator current, an actuator velocity, and an actuator position, and
deactivate an electronically actuated turbocharger waste gate in an open position in response to a temperature of the electronically actuated turbocharger waste gate exceeding the threshold temperature of the turbocharger waste gate.

13. The system of claim 12, where the actuator velocity is based on a derivative of waste gate position.

14. The system of claim 12, further comprising additional instructions to adjust the electronically actuated turbocharger waste gate command in response to a feed forward adjustment of a desired waste gate position.

15. The system of claim 14, further comprising additional instructions to adjust the electronically actuated turbocharger waste gate command in response to an estimated turbocharger waste gate temperature estimate.

16. The system of claim 15, where the estimated turbocharger waste gate temperature estimate is at least partially based on turbocharger waste gate energy consumption being determined.

17. The system of claim 16, where the estimated turbocharger waste gate temperature estimate is at least partially based on energy consumed by the electronically actuated turbocharger waste gate being determined.

* * * * *